May 12, 1953 H. H. WOLFE 2,638,233

DRAFT ATTACHMENT

Filed Oct. 9, 1947 3 Sheets-Sheet 1

INVENTOR.
H. H. WOLFE,

BY

Robt. E. Barry

May 12, 1953 H. H. WOLFE 2,638,233

DRAFT ATTACHMENT

Filed Oct. 9, 1947 3 Sheets-Sheet 2

Inventor

H. H. WOLFE,

By Robt. E. Barry

Attorney

INVENTOR.
H. H. WOLFE,
BY Robt. E. Barry

Patented May 12, 1953 2,638,233

UNITED STATES PATENT OFFICE 2,638,233

DRAFT ATTACHMENT

Harry Hamilton Wolfe, Columbus, Ohio, assignor to The Buckeye Steel Castings Company, Columbus, Ohio Application October 9, 1947, Serial No. 778,843

5 Claims. (Cl. 213—51)

This invention relates to draft attachments for railway rolling stock, and more particularly to the center sills and the connection of strikers and bolster center fillers thereto.

Numerous designs and methods of application of strikers and bolster center fillers are being used such as—

1. Skeletonized castings welded to the center sills. See Patent 2,258,208, issued to G. T. Johnson. These castings are welded to the inside of the sills.

2. Castings riveted to the sills. These are the present A. A. R. standards.

3. Structures formed and welded into units which are riveted to the sills.

4. Structures fabricated and welded to the sills as separate pieces or partially jigged and welded structures.

The present tendency is to reduce the tare weight of cars in order to provide increased revenue loads.

One of the objects of the present invention is to effect a substantial savings in weight, and this I accomplish

*a.* By slotting the castings.

*b.* By slotting the sills with slots larger than the slots in the castings.

*c.* By employing welding instead of riveting.

By slotting the sills with slots larger than the slots of the castings, fillet welds can all be made from the exterior of the sills and in a position favorable to the best welding procedure. As the castings act as spacers for the sills and they can be clamped into the sills at the proper locations, all welding can be performed from the outside of the sills in one set-up.

Another object is to supply a structure whereby the slots are preferably made all of the same length and in alignment both vertically and horizontally to facilitate punching of the sills.

With the foregoing objects outlined and with other objects in view which will appear as the description proceeds, the invention consists in the novel features hereinafter described in detail, illustrated in the accompanying drawings, and more particularly pointed out in the appended claims.

Figure 1:
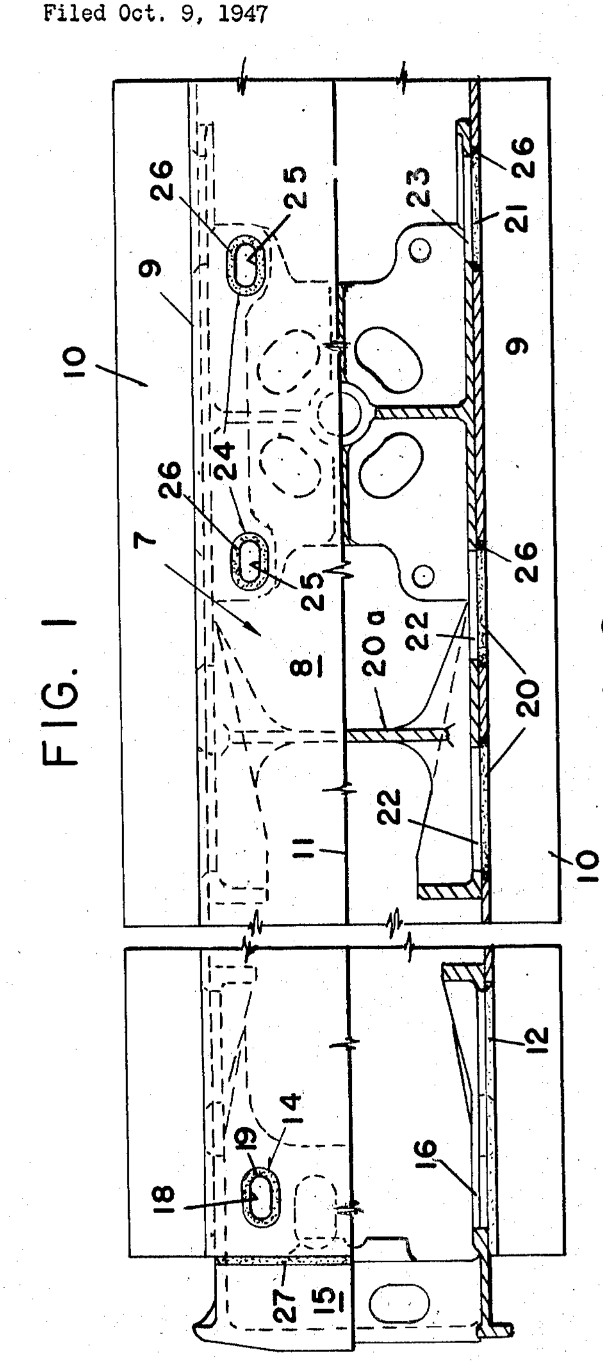
Fig. 1 is a top plan view of the sills, at one end of the car and showing a striker and bolster center filler secured thereto in accordance with the invention, the view being partially in longitudinal horizontal section, to facilitate illustration.
Figure 2:
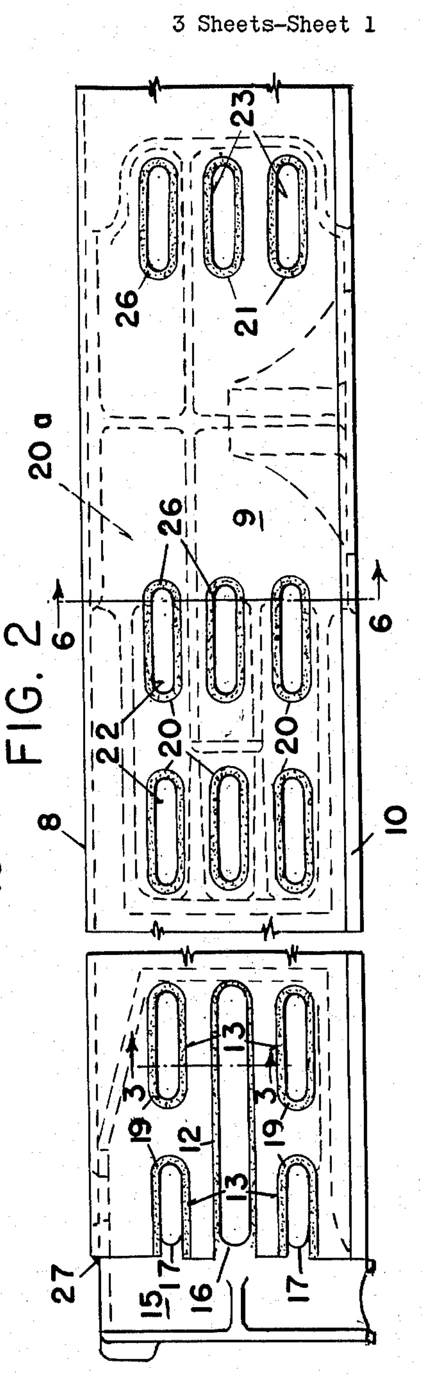
Fig. 2 is a side elevational view of the same.
Figures 3, 4:
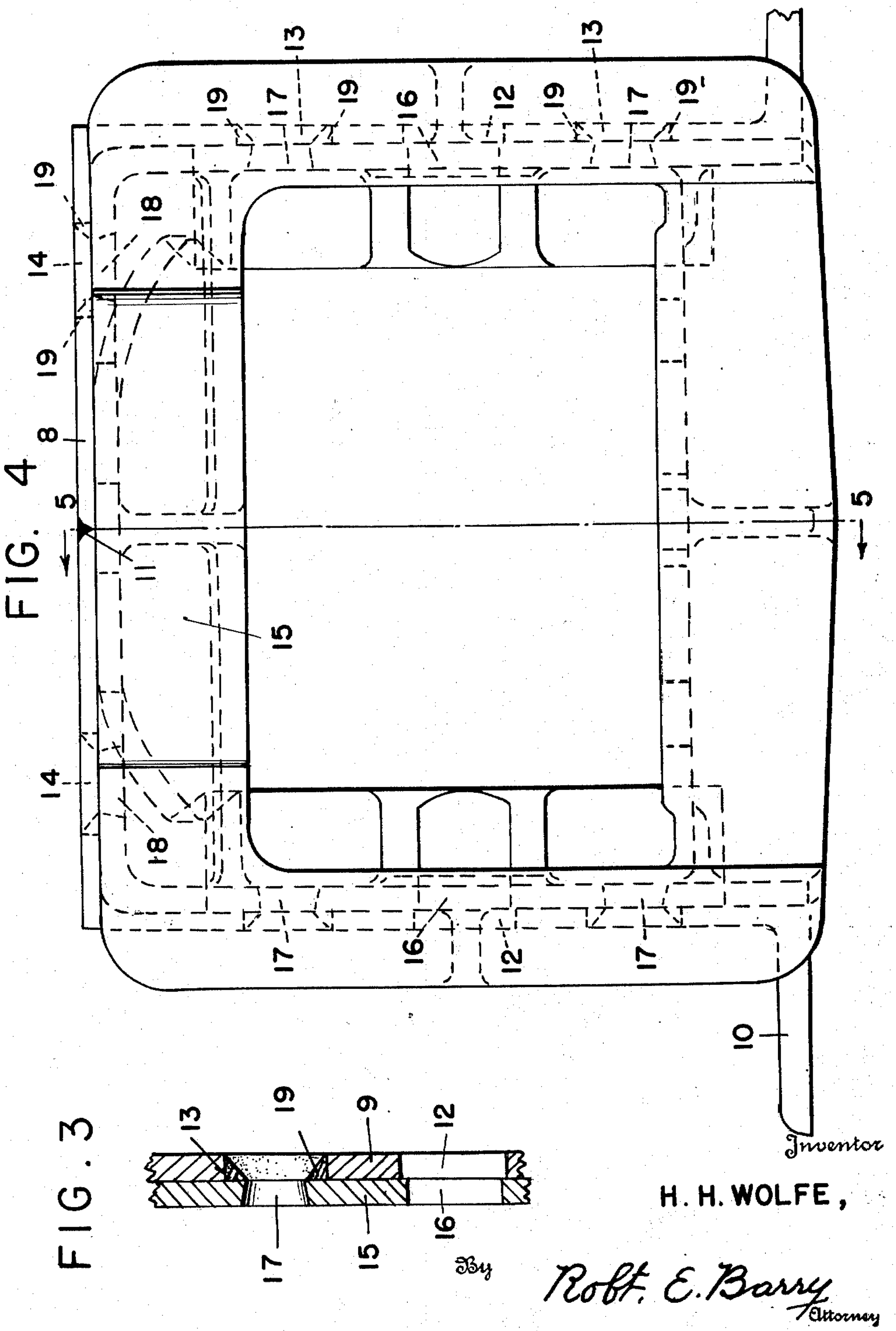
Fig. 3 is an enlarged vertical sectional view of a detail, taken on the line 3—3 of Fig. 2.
Fig. 4 is an enlarged front elevation of the striker.
Figure 5:
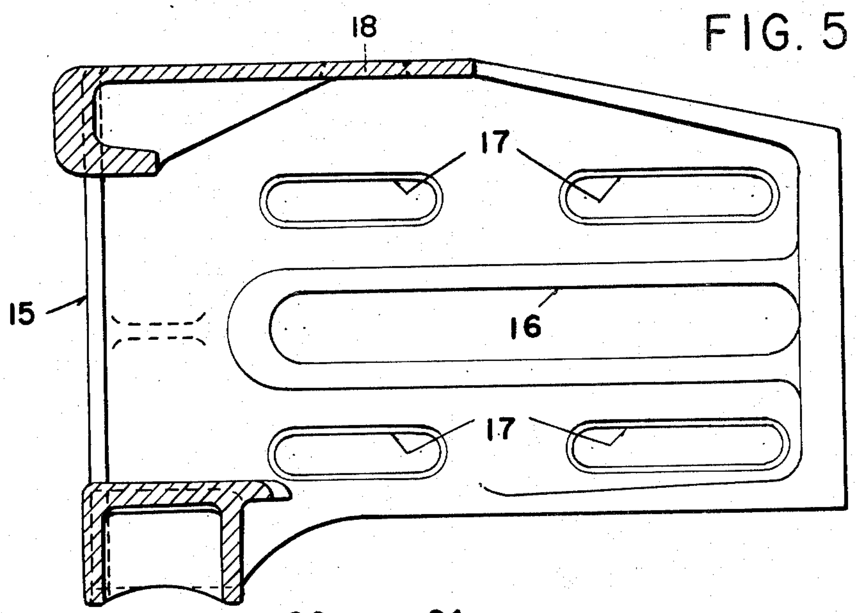
Fig. 5 is a longitudinal vertical sectional view of the striker, on a smaller scale, and taken on the line 5—5 of Fig. 4.
Figure 6:
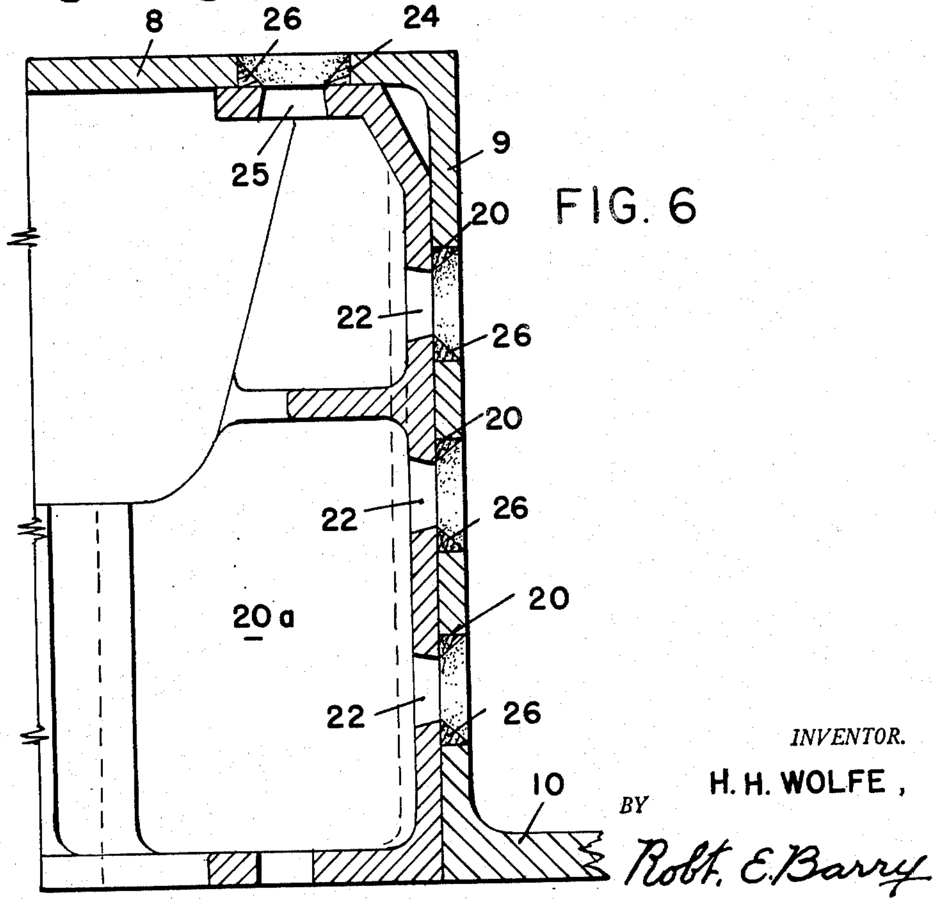
Fig. 6 is an enlarged transverse vertical sectional view of a detail, taken on the line 6—6 of Fig. 2.

Referring to the drawings, the center sills 7 are preferably composed of two Z sections of rolled metal, each consisting of a top 8, a side wall 9 and a lower outwardly extending horizontal flange 10. The Z sections are joined by welding along the top center at 11 for their entire length. Before they are joined, their sides are slotted at 12 for the application of the draft key (not shown). Slots 13 are punched in the vertical webs of the sills above and below each slot 12, and slots 14 are punched in the tops of the sills. The striker 15 is provided with key slots 16 to correspond with the slots 12, and the striker is also provided in its sides with other slots 17 to register with the slots 13. The top of the striker also has slots 18 registering with the slots 14, and at this point, it will be noted that the slots 17 are smaller than the slots 13, and the slots 18 are smaller than the slots 14, to provide for a bead of weld metal 19 which may be applied at each of the registering holes or slots for joining the striker to the sills.

The center filler 20*a* is joined to the sills in a similar manner, and it will be noted that the vertical webs of the sills are provided with slots 20 and 21 which register with smaller slots 22 and 23, respectively, in the sides of the center filler. Likewise, the tops of the sills have slots 24 registering with smaller slots 25 in the top of the bolster center filler, to permit the application of beads 26 of welding metal about the slots 22, 23 and 25.

Preferably slots 13 and 20 in the sills are the same width as the key slots 12. Also slots 20 are preferably in line longitudinally with slots 12 and 13. Also slots 21 are preferably in alignment with slots 12, 13 and 20. Likewise, slots 24 are in alignment with slots 14.

Slots 17 and 18, and slots 22 and 23 in the striker and center filler are not absolutely essential to the present invention, but are cored in the castings to save weight.

To assemble, the two sections of the sills 7 are clamped together, using two strikers and two center fillers as spacers. The strikers and center fillers are spaced longitudinally after which all welding along the top center of the sills at 11, and around the slots in the strikers and center fillers and along the top at 27, can be performed from the exterior of the sills. The sills can be manipulated so that all welding is done vertically which is the most advantageous position for proper welding. The strikers are usually welded at 27 to the sills, to obtain firm connections.

In case of failure of a striker or center filler, due to wrecks or derailments, the striker and center filler castings can be removed by burning around the slots to remove the weld metal. New castings can be applied in the same manner as the original applications.

In actual practice, it will be noted that the slots in the castings are made generally 1'' wide and 5'' long, and in the sills, 1¾'' wide and 5¾'' long. This allows ⅜'' overlap of the castings on the sills all around the slots for the application of ⅜'' fillet welds. The welded construction shown will save approximately 200 pounds weight per car over the usual riveted construction. This saving in weight, together with the ease of application, provides an economical center sill construction.

The advantages of my improvements may be summarized, as follows:

1. Reduces weight. Approximately 200 pounds per car.

2. The welds are all made from the outside of the sills. This facilitates welding and inspection of welds.

3. A one piece steel casting is used for the striker and one for the center filler which requires the minimum of manual welding to attach them to the sills.

4. The one piece cast steel strikers and center fillers are economical to produce and the center filler can be hot die pressed to very close tolerances.

5. The castings act as spacers for the two Z sections which form the sills.

6. The castings can be removed by burning out the weld metal around the slots, leaving the slots in the sills approximately the same size as the original punching. New castings can be applied in the original manner.

From the foregoing, it is believed the construction of my draft attachments and the advantages thereof may be readily understood, and I am aware that changes may be made in the details disclosed, without departing from the spirit of the invention, as expressed in the following claims.

What I claim and desire to secure by Letters Patent is:

1. In a draft attachment for a railway vehicle, two substantially Z-shaped center sills each having a top wall arranged with a free edge thereof adjacent each other and welded therealong forming an inverted U-shaped member having spaced substantially vertical side walls and a single top wall, said side walls having a plurality of elongated slots therein disposed horizontally and in horizontal and vertical alignment, said top wall having slots therein aligned lengthwise of said member, a striker extending into said member having a top portion in flat engagement with an under surface of said top wall, said striker having slots therein of smaller dimensions than the slots in the top wall each registering respectively with a slot in said top wall, welded metal along the boundaries of the slots in said top wall and around the slots in the top portion of the striker joining the striker to said top wall, substantially straight side surfaces on said striker in flat engagement with inner surfaces of the respective side walls of said member, said striker having slots therein of smaller cross sectional dimensions than the slots in said side walls each registering respectively with a slot in the side walls, welded metal along the boundaries of the slots in said side walls and around the slots in the sides of the striker joining the striker to the respective side walls of said member, a center filler including webs having substantially straight side surfaces in flat engagement with corresponding inner surfaces of said side walls, said webs having slots therein of smaller dimensions than the slots in said side walls each registering respectively with a slot in said side walls, welded metal along the boundaries of the slots in said side walls and around the slots in said webs joining the center filler to said side walls, a flat surface at the top of the center filler in engagement with an under surface of said top wall, said center filler having slots in the top thereof of smaller dimensions than the slots in said top wall each registering respectively with a slot in said top wall, and welded metal along the boundaries of the last-mentioned slots and around the boundaries of the slots in the top of center filler joining the center filler to said top wall.

2. In a draft attachment for a railway vehicle, a center sill structure of inverted U-shape having spaced substantially vertical side walls and a top wall, said side walls and said top wall having a plurality of slots therein, a striker extending into said sill structure having a top portion in flat engagement with an under surface of said top wall, an upper portion of said striker having slots therein of smaller dimensions than the slots in said top wall each registering respectively with a slot in said top wall, welded metal along the boundaries of the slots in said top wall and around the slots in the upper portion of the striker joining the striker to said top wall, side surfaces on said striker in engagement with inner surfaces of the respective side walls of said sill structure, said striker having slots therein of smaller cross sectional dimensions than the slots in said side walls each registering respectively with a slot in the side walls, welded metal along the boundaries of the slots in said side walls and around the slots in the sides of the striker joining the striker to the respective side walls of said sill structure, a center filler having side surfaces in flat engagement with corresponding inner surfaces of said side walls and having slots therein of smaller dimensions than the slots in said side walls each registering respectively with a slot in said side walls, welded metal along the boundaries of the slots in said side walls and around the slots in the sides of the center filler joining the center filler to said side walls, a portion at the top of the center filler in engagement with an under surface of said top wall, said center filler having slots in the top thereof of smaller dimensions than the slots in said top wall each registering respectively with a slot in said top wall, and welded metal along the boundaries of the last-mentioned slots and around the boundaries of the slots in the top of center filler joining the center filler to said top wall.

3. In a draft structure for a railway vehicle, two substantially Z-shaped center sills each having a top wall arranged with its free edge adjacent each other and welded therealong forming an inverted U-shaped sill structure having spaced substantially vertical side walls and a top wall, said top and side walls having a plurality of slots, a striker extending into said sill structure having a top portion in engagement with an under surface of said top wall, an upper portion of said striker having slots therein of smaller dimensions than the slots in the top wall each registering respectively with a slot in said top wall, welded metal joining boundary edges of the slots in said top wall with top faces of the striker around the slots in said upper portion of the striker connecting the striker to said top wall, side surfaces on said striker in engagement with inner surfaces of the respective side walls of said sill structure, said striker having slots therein of smaller cross sectional dimensions than the slots in said side walls each registering respectively with a slot in said side walls, welded metal joining boundary edges of the slots in said side walls with outer side faces of the striker around the slots, a center filler including webs having outer side surfaces in engagement with corresponding inner surfaces of said side walls, said webs having slots therein of smaller dimensions than the slots in the side walls each registering respectively with a slot in said side walls, welded metal joining boundary edges of the slots in said side walls with outer side faces of the center filler around the slots in said webs connecting the center filler to side walls, top portions of the center filler engaging an under surface of said top wall, said top portions of the center filler having slots therein of smaller dimensions than the slots in said top wall each registering respectively with a slot in said top wall, and welded metal joining boundary edges of the slots in said top wall with upper face portions of the center filler around the slots in the top portions of center filler connecting the center filler to said top wall.

4. In a draft attachment for a railway vehicle, a center sill structure of inverted U-shape having spaced substantially vertical side walls and a top wall, said side walls and said top wall each having a plurality of slots therein, a striker extending into said sill structure having a top portion in engagement with an under surface of said top wall, an upper portion of said striker having slots therein of smaller dimensions than the slots in said top wall each registering respectively with a slot in said top wall, welded metal along the boundaries of the slots in said top wall and around the slots in the upper portion of the striker joining the striker to said top wall, side surfaces on said striker in engagement with inner surfaces of the respective side walls of said sill structure, the sides of said striker having slots therein of smaller cross sectional dimensions than the slots in said side walls each registering respectively with a slot in the side walls, and welded metal along the boundaries of the slots in said side walls and around the slots in the sides of the striker joining the striker to the respective side walls of said sill structure.

5. In a draft structure for a railway vehicle, a center sill structure of substantially inverted U-shape having spaced substantially vertical side walls and a top wall, said side walls and said top wall each having a plurality of slots therein, a center filler including webs having outer side surfaces in engagement with corresponding inner surfaces of said side walls, said webs having slots therein of smaller dimensions than the slots in the side walls each registering respectively with a slot in said side walls, welded metal joining boundary edges of the slots in said side walls with outer side faces of the center filler around the slots in said webs connecting the center filler to side walls, top portions of the center filler engaging an under surface of said top wall, said top portions of the center filler having slots therein of smaller dimensions than the slots in said top wall each registering respectively with a slot in said top wall, and welded metal joining boundary edges of the slots in said top wall with upper face portions of the center filler around the slots in the top portions of center filler connecting the center filler to said top wall.

HARRY HAMILTON WOLFE.

References Cited in the file of this patent

UNITED STATES PATENTS

| Number | Name | Date |
|---|---|---|
| 781,877 | Garrett | Feb. 7, 1905 |
| 1,142,358 | O'Connor | June 8, 1915 |
| 1,183,945 | Beard | May 23, 1916 |
| 1,268,980 | Krumholz | June 11, 1918 |
| 1,290,091 | Cole | Jan. 7, 1919 |
| 1,290,093 | Cole | Jan. 7, 1919 |
| 1,786,914 | Martin | Dec. 30, 1930 |
| 1,799,078 | Barrows | Mar. 31, 1931 |
| 1,804,080 | Barrows | May 5, 1931 |
| 2,143,216 | Tesseyman et al. | Jan. 10, 1939 |
| 2,231,358 | Cottrell et al. | Feb. 11, 1941 |
| 2,237,716 | Spaulding | Apr. 8, 1941 |
| 2,244,200 | Johnson | June 3, 1941 |
| 2,258,208 | Johnson | Oct. 7, 1941 |